United States Patent [19]

Liu

[11] Patent Number: 5,898,691

[45] Date of Patent: Apr. 27, 1999

[54] METHOD AND APPARATUS FOR CONGESTION DISTRIBUTED ADAPTIVE ROUTING

[75] Inventor: Zheng Liu, Saratoga, Calif.

[73] Assignee: Cisco Technology, Inc., San Jose, Calif.

[21] Appl. No.: 08/720,210

[22] Filed: Sep. 26, 1996

[51] Int. Cl.[6] .................................................. H04J 3/16
[52] U.S. Cl. ..................... 370/415; 370/218; 370/437; 370/463
[58] Field of Search ..................... 370/415, 218, 370/355, 259, 380, 463, 402, 349, 350, 437, 465

[56] References Cited

U.S. PATENT DOCUMENTS

| | | | |
|---|---|---|---|
| 4,654,654 | 3/1987 | Butler et al. | 370/463 |
| 4,679,190 | 7/1987 | Dias et al. | 370/355 |
| 4,894,824 | 1/1990 | Hemmady et al. | 370/380 |
| 5,349,579 | 9/1994 | Madonna et al. | 370/259 |
| 5,590,118 | 12/1996 | Nederlof | 370/218 |

*Primary Examiner*—Hassan Kizou
*Assistant Examiner*—Shick Hom
*Attorney, Agent, or Firm*—Blakely, Sokoloff, Taylor & Zafman LLP

[57] ABSTRACT

A method for scheduling a connection through a node is disclosed. A resource request message is received from a master. An identity of a trunk where the resource request message is to be issued is determined. It is determined whether the node is issuing a predetermined number of resource request messages previously received. The resource request message is issued if the node is issuing less than the predetermined number of resource request messages previously received on the trunk. A busy message is sent to the master if the node has the predetermined number of resource request messages outstanding on the trunk.

14 Claims, 8 Drawing Sheets

METHOD AND APPARATUS FOR CONGESTION DISTRIBUTED ADAPTIVE ROUTING

FIELD OF THE INVENTION

The present invention relates to the field of network routing. More specifically, the present invention relates to a method and apparatus for scheduling resource requests in a network.

BACKGROUND OF THE INVENTION

In the past, when a connection was routed through a node by a master node, the node would lock to preclude other master nodes from routing a connection through the node. The locking scheme allowed only one connection at a time to be routed through the node. This network routing technique prevented congestion from occurring at a via or slave node on the routing path. A node is a master when the node is a first node along a routing path. A node is a destination node or a slave node when it is the last node along a routing path. Nodes along the routing path which are neither master or slave are via nodes.

The locking approach prevented multiple master nodes from choosing a single via to route connections. This reduced the problem of message loss and congestion aggregation associated from messages arriving simultaneously at the via node from its links and congesting the via node. The locking approach also prevented multiple routing requests from being sent to a slave node from multiple directions. This reduced the problem of requiring a large message queue and extended CPU usage in processing resource request and resource confirmation messages.

There were, however, several drawbacks to this approach of network routing. First, because a node was only allowed to be used for routing one connection at a time, available bandwidth on trunks between the locked node and other nodes were not allocated. This was an inefficient use of bandwidth. Second, whenever the node locked out a connection from a master node, the master node would have to re-initialize its routing protocol. This required additional time and delay. Third, master nodes wishing to route a connection through a locked node would have to retry their connection routing after waiting a period of time. Upon retry, the master node may be locked out by the same connection or by a new connection established by another master node during the waiting period. The order in which attempts to route through the node was not used in prioritizing routing connections.

SUMMARY OF THE INVENTION

One object of the present invention is to allow multiple master nodes to route connections through a node.

Another object of the present invention is to prevent excessive processing of messages arriving from various directions at a time.

Another object of the present invention is to assure that traffic congestion is always distributed along a routing path, rather than at any of the nodes.

Another object of the present invention is to minimize the delays associated in reinitializing a routing protocol.

A further object of the present invention is to schedule connections through a node based on the order in which attempts were made to access the node.

A method for scheduling a connection through a node is disclosed. A resource request message is received from a master. An identity of a trunk where the resource request message is to be issued is determined. It is determined whether the node is issuing a predetermined number of resource request messages previously received. The resource request message is issued if the node is issuing less than the predetermined number of resource request messages previously received on the trunk. A busy message is sent to the master if the node has the predetermined number of resource request messages outstanding on the trunk.

A switch is disclosed. The switch includes a trunk receiver that receives a resource request message from a master. A routing engine is coupled to the trunk receiver. The routing engine determines an identity of a trunk where the resource request message is to be issued and whether the switch is issuing a predetermined number of resource request messages previously received on the trunk. The switch issues the resource request message if the switch is issuing less than the predetermined number of resource request messages previously received on the trunk. The switch sends a busy message to the master if the switch is issuing more than the predetermined number of resource request messages on the trunk.

Other objects and advantages of the present invention will be apparent from the accompanying drawings and from the detailed description that follows below.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
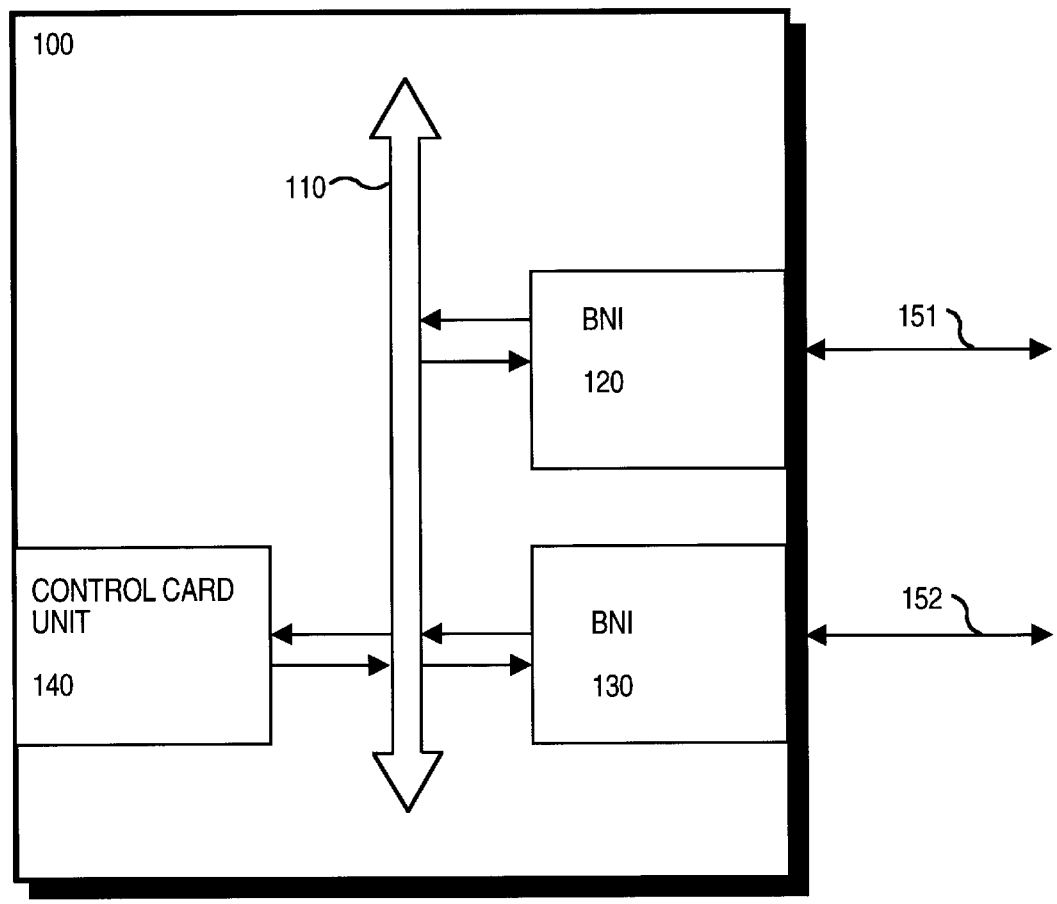
FIG. 1 illustrates a block diagram of a digital switch upon which an embodiment of the present invention can be implemented.

Referring to FIG. 1, the digital switch upon which an embodiment of the present invention can be implemented is shown as 100. The digital switch 100 consists of a plurality of Broadband Network Interface units (BNI 120 and BNI 130) and a control card unit 140. Each Broadband Network Interface unit consists of a network interface connected to a broadband digital communication line 151 and 152. Every Broadband Network Interface unit is also coupled to a high-speed backplane bus 110 within the digital switch.

The control card unit 140 is also coupled to the backplane bus 110. The control card unit 140 generates, routes, and terminates control signals to and from the digital communication lines that are coupled to the digital switch. The control card unit 140 includes a processor that processes control signals and a memory that stores variables or intermediate information during execution of instructions by the processor.

The present invention is related to the use of the control card 140 to schedule resource requests in a network. According to one embodiment, scheduling resource requests in a network is performed by the processor in the control card unit 140 executing sequences of instructions contained in the memory. Such instructions may be read into the memory from other computer-readable mediums. Execution of the sequences of instructions contained in the memory causes the processor to schedule resource request messages, as will be described hereafter. In alternative embodiments, hardwired circuitry may be used in place of or in combination with software instructions to implement the present invention. Thus, the present invention is not limited to any specific combination of hardware circuitry and software.

Figure 2:
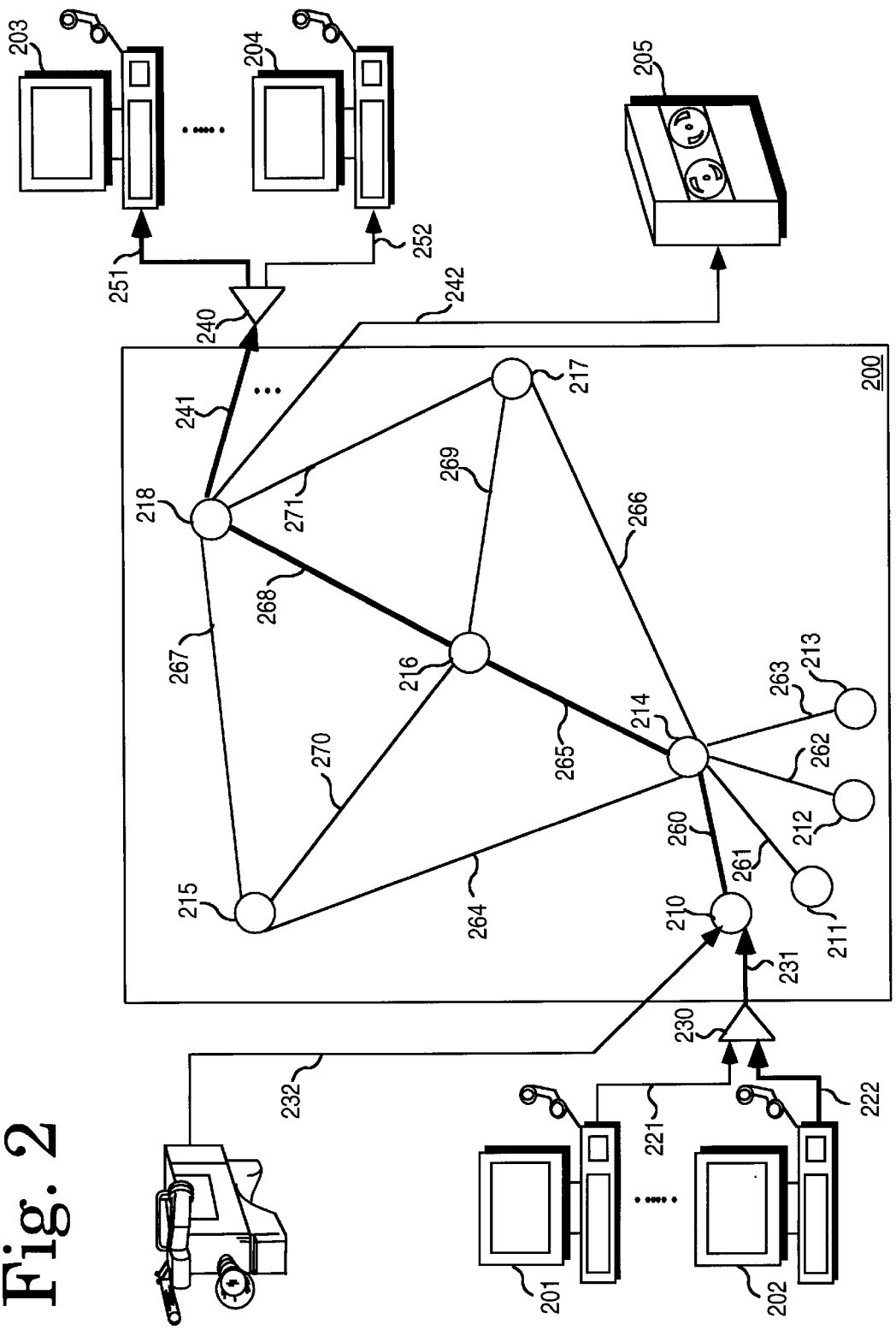
FIG. 2 illustrates a network implementing the present invention.

Referring now to FIG. 2, there is shown a network 200 that is arranged for establishing virtual circuit connections between pairs of nodes. In one embodiment, the nodes are implemented by the digital switch shown in FIG. 1. Terminals 201 and 202 transmit data through customer connection lines 221 and 222 to a multiplexer 230. Other terminals, not shown in FIG. 2, but indicated by a series of dots, also can transmit data into the multiplexer 230. Although the terminals 201 and 202 are shown as computer terminals, they also may be digitized voice, video, or other data terminals. A resulting upward stream of data, interspersed with one another, are transmitted from the multiplexer 230 over a line 231 to a node 210 in the network 200. Another line 232, and other lines represented by a series of dots, also transmit streams of data into the node 210.

Although a typical network may contain tens to hundreds of nodes and several hundred trunks linking the nodes, only nine nodes 210–218 and twelve trunks 260–271 are shown in FIG. 2 to illustrate an arrangement of the invention. In FIG. 2, only node 210 is arranged as a node for receiving packets from terminal equipments. Any or all of the other nodes 211–218 may also be nodes in an operating system, but are not shown as nodes in the network 200 merely to simplify the drawing.

For purposes of illustrating the operation of network 200, an exemplary virtual connection is shown by a heavily weighted path line linking the terminal equipment 202 to the terminal equipment 203. Node 218 is shown as an egress node in FIG. 2. The other nodes also may be egress nodes but are not shown as such in FIG. 2 to simplify the drawing. From the egress node 218, streams of packets are transmitted over egress lines 241 and 242 and others, represented by a series of dots, to the multiplexers, demultiplexer 240, and equipment 205. For purposes of simplification of FIG. 2, only a single demultiplexer 240 is shown. The stream of data packets transmitted over the egress line 241 is separated within the demultiplexer 240 and passed over connection lines 251 and 252, respectively, to terminals 203 and 204. Other lines and terminals also are supplied with streams of packets from the demultiplexer 240. Those other lines and terminals are represented in FIG. 2 by a series of dots. Although typical transmission is 2-way over such a virtual connection, only 1-way transmission from the terminal equipment 202 through the network 200 to the terminal equipment 203 is shown in FIG. 2. This virtual circuit connection is established from the multiplexer 230 in line 231 through the nodes 210, 214, and 216, trunks 260, 265, and 268, and egress node 218, egress line 241, to the demultiplexer 240.

Virtual circuits are established by routing connections through a plurality of nodes. Each node is maintained by a computer system such as the one shown in FIG. 1. A node is a master when that node is a first node along a routing path. A node is a destination node or a slave when it is the last node along a routing path. Nodes along the routing path which are neither a master or a slave are via nodes. Referring to FIG. 2, in the virtual circuit connecting terminal 201 and terminal 203, node 210 is a master. Nodes 214 and 216 are via nodes. Node 218 is a slave.

In establishing a virtual circuit, a master first sends a resource request message to the node it wishes to connect to. The resource request message contains information regarding the connection bandwidth and other attributes required by the master for sending information to the slave. The resource request message is forwarded from the master to the nearest via along a routing path to the slave. The via checks whether it has the resource available to establish its portion of the connection. If the resources are not available, the via sends a rejection message back to the master. If the resources are available at the via, the resource request message is forwarded by the via to a next node along the routing path. This next node performs a similar checking procedure and continues to forward the resource request message along the routing path or send a rejection message back to the master.

When the slave receives the resource request message from the last via node along the routing path, after performing a similar checking procedure, the slave sends a resource request confirmed message to the master. This informs the master that the required resources have been reserved. Upon reception of the resource request confirmed message, the master sends a commitment message individually to all the via and slave nodes to commit the resources requested.

In one embodiment of the present invention, each node in the network 200, may route a plurality of connections at one time. A predetermined number of resource request messages are allowed to be issued along each trunk of node by the node at one time. Resource request messages which are sent to a node to be issued after the predetermined number has been met are stored in a forwarding queue corresponding to the trunk they are to be forwarded on. A busy or congestion message is sent to the master which generated the resource request message. The congestion message from the node provides a feedback mechanism that promptly notifies the master about a congestion at a via or slave. The congestion message may contain information regarding the degree of congestion at the trunk of the node. The node issues a next resource request message in its forwarding queue upon receiving a commitment message from a master.

In one embodiment of the present invention, the master starts a timer after issuing a resource request message. Upon the reception of a congestion message from a via, the master adjusts the timer according to the degree of congestion which is carried in the received congestion message. If the timer exceeds a predetermined plus adjusted period of time before the master receives a resource request confirmed message, the master will either reissue the resource request message or choose another routing path.

Figure 3:
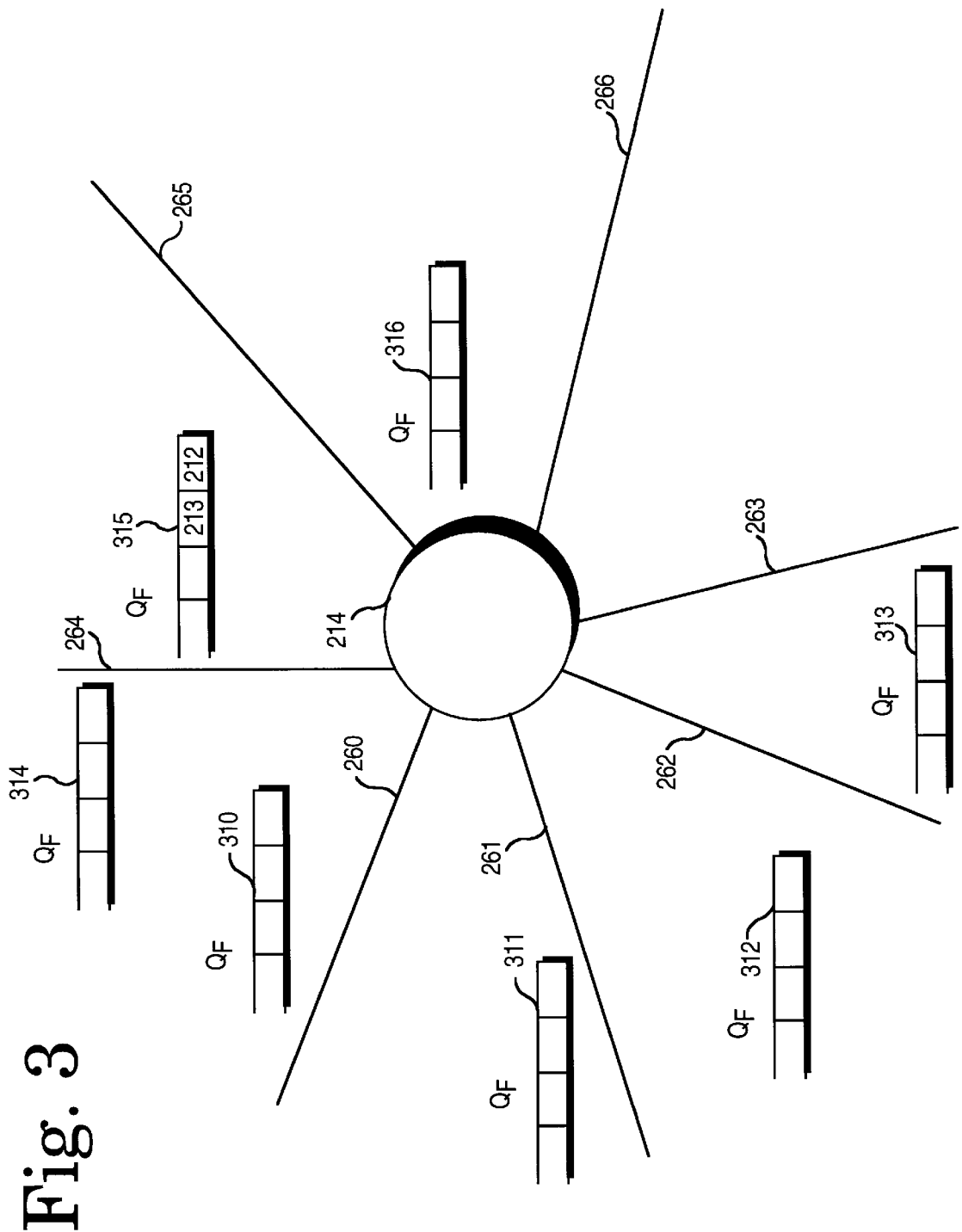
FIG. 3 illustrates a via node according to an embodiment of the present invention.

FIG. 3 illustrates a via node according to one embodiment of the present invention. Node 214 is coupled to a plurality of trunks 260–266. Each of the trunks 260–266 are connected to a node (see FIG. 1). Node 214 has a forwarding queue assigned to each trunk it is coupled to. Forwarding queues 310–316 are assigned to trunks 260–266, respectively. Node 214 is allowed to issue a predetermined number of resource request messages along each of trunks 260–266. Resource request messages which are sent to node 214 to be issued on one of trunks 260–266 after a predetermined number of resource request messages are already being issued on one of trunks 260–266 are stored in a forwarding queue corresponding to the trunk.

For example, if nodes 210–213 (see FIG. 1) wish to establish a virtual circuit with node 218 via nodes 214 and 216, node 214 will receive four resource request messages to be issued on trunk 265. Assuming that the predetermined number of resource request messages that node 214 is allowed to issue along a trunk at one time is two, node 214 will issue the first two resource request messages it received and store the rest into forwarding queue 315. In this example, assuming that resource request messages are received from nodes 210, 211, 212, and 213, respectively in that order, node 214 will issue the messages from 210 and 211 first, and store the messages from 212 and 213 into forwarding queue 315, as illustrated in FIG. 3. Since resource request messages are only being issued on trunk 265 by node 214, forwarding queues 310–314, and 316 are empty.

Figure 4:
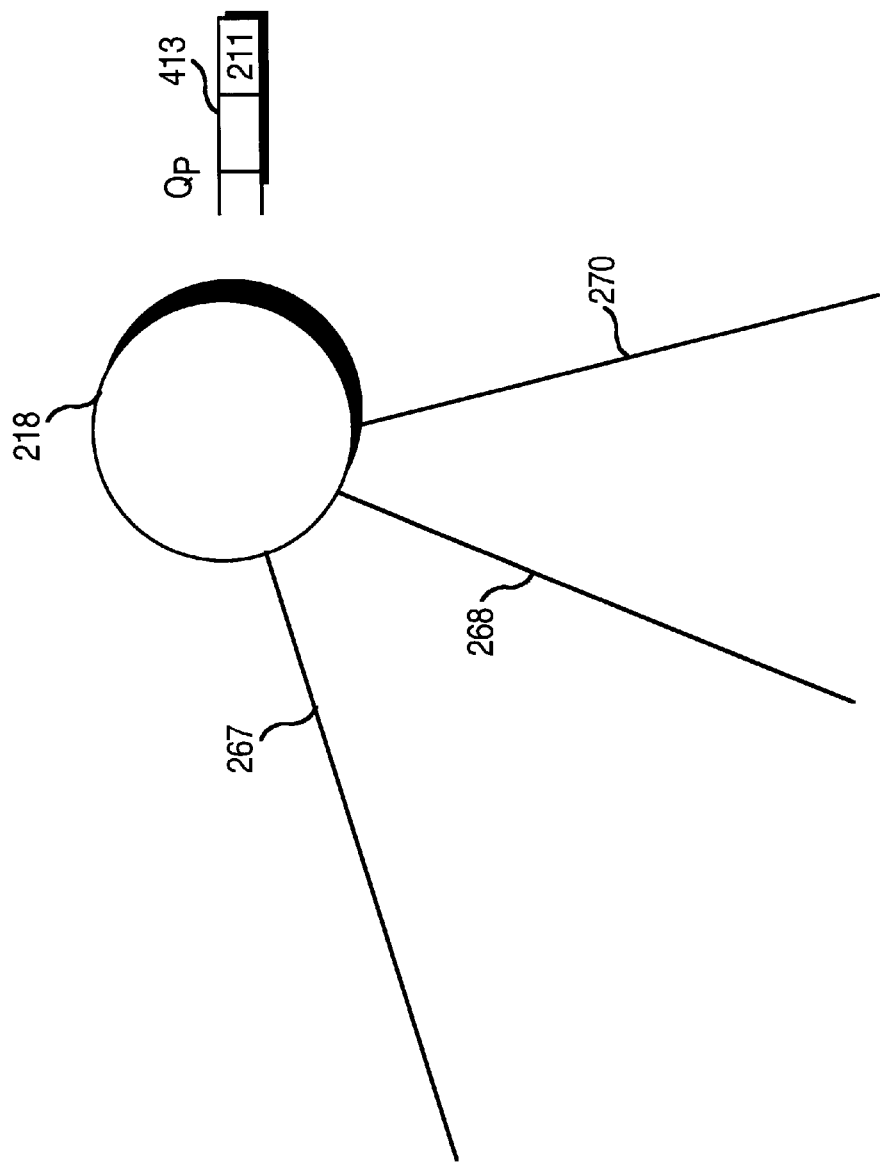
FIG. 4 illustrates a slave node according to an embodiment of the present invention.

FIG. 4 illustrates a slave node according to one embodiment of the present invention. Node 218 is coupled to a plurality of trunks 267–270 which are coupled to nodes 215–217, respectively (see FIG. 2). Node 218 comprises a processing queue 413 that stores resource request messages. Resource request messages are stored in the processing queue 413 when previously received resource request messages are being processed by the node 218.

In the previous example, nodes 210–213 (see FIG. 1) wished to establish a virtual circuit with node 218 via nodes 214 and 216. Upon receiving a resource request message from 210 and 211, respectively in that order, node 218 processes the resource request message from node 210 and stores the resource request message from node 211 in the processing queue 413, as illustrated in FIG. 4. After processing the resource request message from node 210, node 218 sends a resource request confirmed message to node 210. Upon reception of the resource request confirmed message, node 210 sends a commitment message to via nodes 214 and 216 and to node 218. Upon reception of the commitment message, node 218 processes the resource request message from node 211 and via node 214 issues the resource request message from node 212.

It should be appreciated that all the nodes 210–218 in network 200 comprise a forwarding queue for each trunk it is connected to and a single processing queue. FIG. 3 illustrates the forwarding queues 310–316 of node 214 and FIG. 4 illustrates the processing queue 413 of node 218 to simplify the drawings.

The routing protocol of the present invention allows the via nodes in network 200 to participate in a fair distribution of congestion. Regardless of the number of resource request messages initiated by master nodes in the network, the number of resource request messages that are issued are controlled such that excessive traffic to neighboring nodes is not generated. The present invention performs resource request message flow control to the links connected to the node. In a large network, multiple links may fail within a given period of time. As a result, masters, slaves, and via nodes will be involved in rerouting failed connections. The present invention guarantees that a via node neither receives more resource request messages than it can process nor issues more resource request messages that its neighboring nodes can process. Thus, multiple connections may be routed through a single node at one time without the problems associated with message loss and congestion.

The forwarding queues used for storing resource request messages in the network 200 allow the resource request messages to be recorded in the order the messages were received. Thus, a node is able to process the messages in the queue and issue the messages onto appropriate trunks in the order in which they were received. By storing resource request messages that are not immediately issued by the node in the forwarding queue, the delays associated with requiring a master to resend the resource request message is minimized.

In one embodiment of node 214, a pace control mechanism records the number of consecutive resource request messages that have been processed by node 214. Pace control mechanism operates to introduce a time pause to allow node 214 to allocate CPU time to other processes. The time pause is introduced when the node has processed a predetermined number of consecutive resource request messages. The time pause may be a predetermined period of time. The pace control mechanism resides inside node 214 and may be implemented by any known circuitry.

Figure 5:
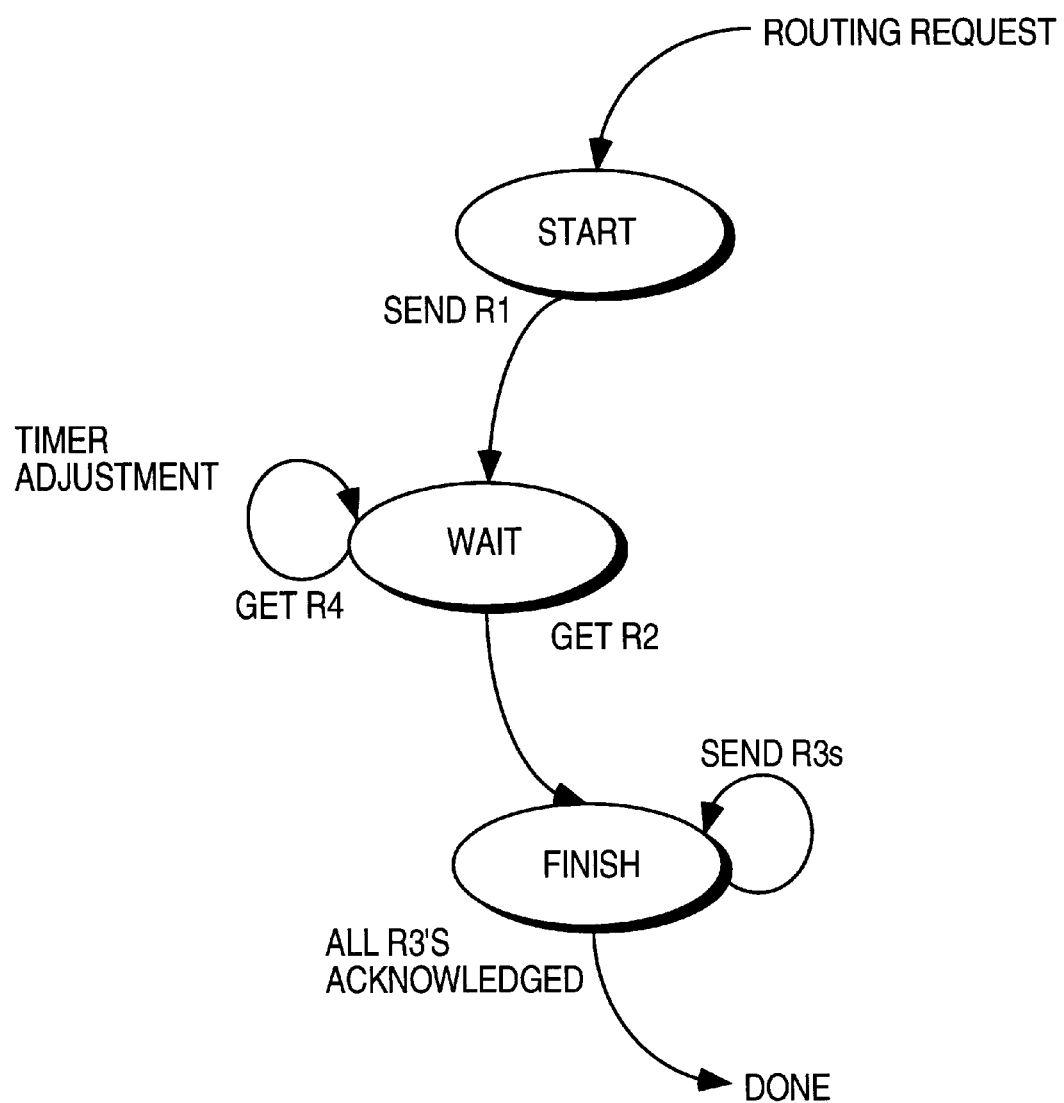
FIG. 5 illustrates a routing state diagram for a master implementing the present invention.

FIG. 5 illustrates a routing state diagram for a master implementing the present invention. The master receives a routing request from an application wishing to establish a virtual circuit. This places the master in the start state. While in the start state, the master prepares a resource request message (shown as R1) which it sends to the nearest node along the routing path to the slave.

After sending the resource request message, the master is in the wait state. While in the wait state, the master can receive either a busy or congestion signal (shown as R4) from any one of the vias along the routing path to the slave or a resource request confirmed message (shown as R2) from the slave. When receiving a busy or congestion signal, the master adjusts the timer and remains in the wait state.

After receiving a resource request confirmed message, the master is placed in the finish state. In the finish state, the master sends a commitment message (shown as R3) to all the via and slave nodes in the routing path. After the commitment messages are acknowledged, the process is completed.

Figure 6:
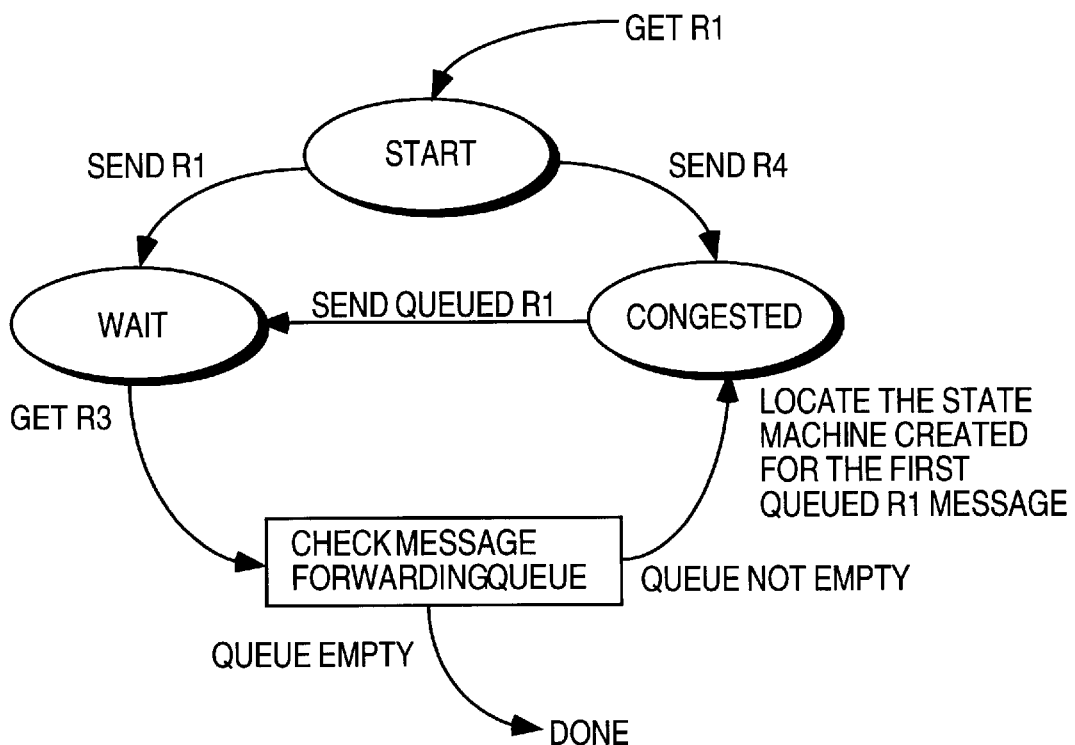
FIG. 6 illustrates a routing state diagram for a via implementing the present invention.

FIG. 6 illustrates a routing state diagram for a via implementing the present invention. When the via gets a resource request message from the master or a previous via node it will be placed in the start state. While in the start state, the via will forward the resource request message to the next node along the routing path if there is no congestion. This will place the via node in the wait state. While in the start state, if there are more than a predetermined number of resource request messages currently being issued by the via, the via will send a busy or congested message to the master. This will place the via in the congested state.

While in the wait state, the via will wait for a commitment message from the master. Upon receiving a commitment message from the master, the via will check to see if there are any resource request messages in its forwarding queue. If there are not resource request messages in its forwarding queue, the process is completed. If there are resource request messages in its forwarding queue, the via is placed in the congested state.

While in the congested state, the via will issue the next resource request message in its forwarding queue upon receiving a commitment message from the master. Issuing the next resource request message in the forwarding queue places the via node in the wait state.

Figure 7:
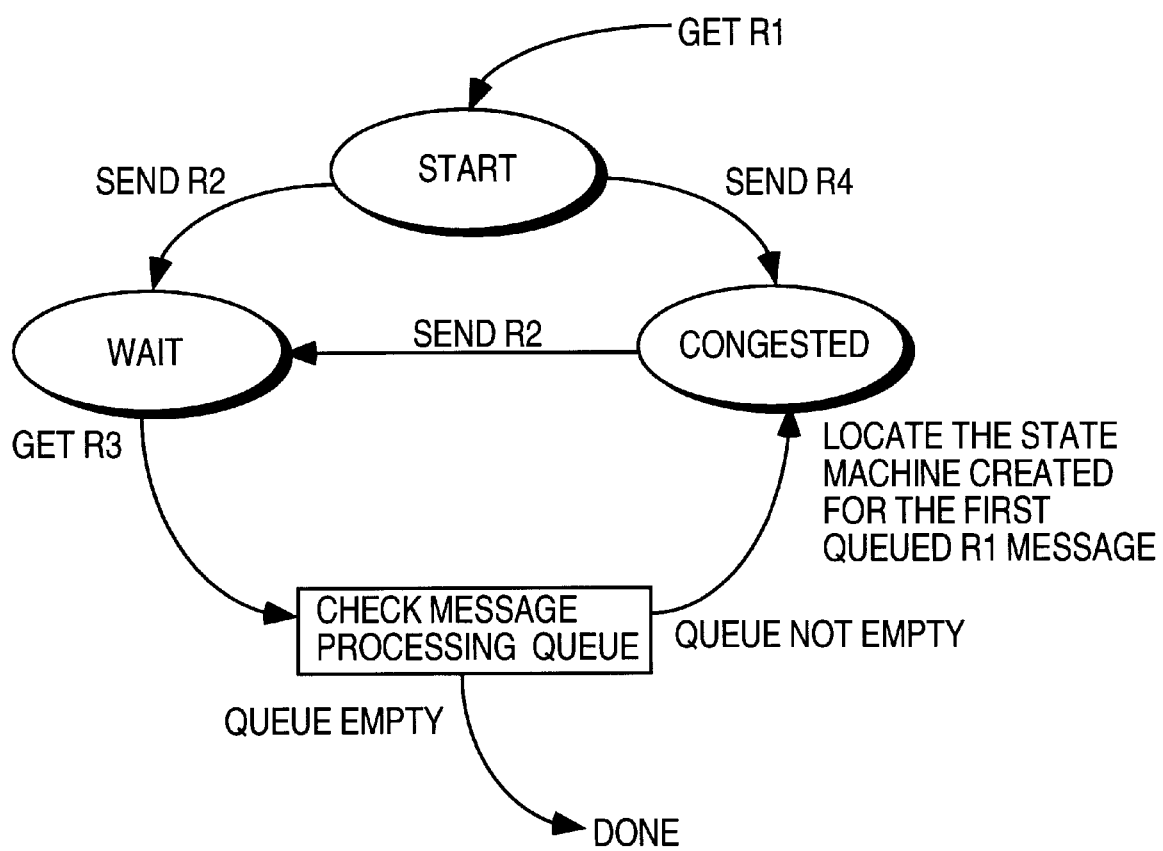
FIG. 7 illustrates a routing state diagram for a slave implementing the present invention.

FIG. 7 illustrates a routing state diagram for a slave implementing the present invention. When the slave gets a resource request message from the master or a previous via node it will be placed in the start state. While in the start state, the via will send a resource request confirmed message back to the master if there is no congestion. This will place the slave in the wait state. While in the start state, if there are more than a predetermined number of resource request messages currently being processed by the slave, the slave will send a busy or congested message to the master. This will place the slave in the congested state.

While in the wait state, the slave will wait for a commitment message from the master. Upon receiving a commitment message from the master, the slave will check to see if there are any resource request messages in its processing queue. If there are not resource request messages in its processing queue, the process is completed. If there are resource request messages in its processing queue, the slave is placed in the congested state.

While in the congested state, the slave will send a resource request confirmed message back to the master whose resource request message is next in its processing queue upon receiving a commitment message from the master. Sending a resource request confirmed message to the master whose resource request message is next in the processing queue places the slave in the wait state.

Figure 8:
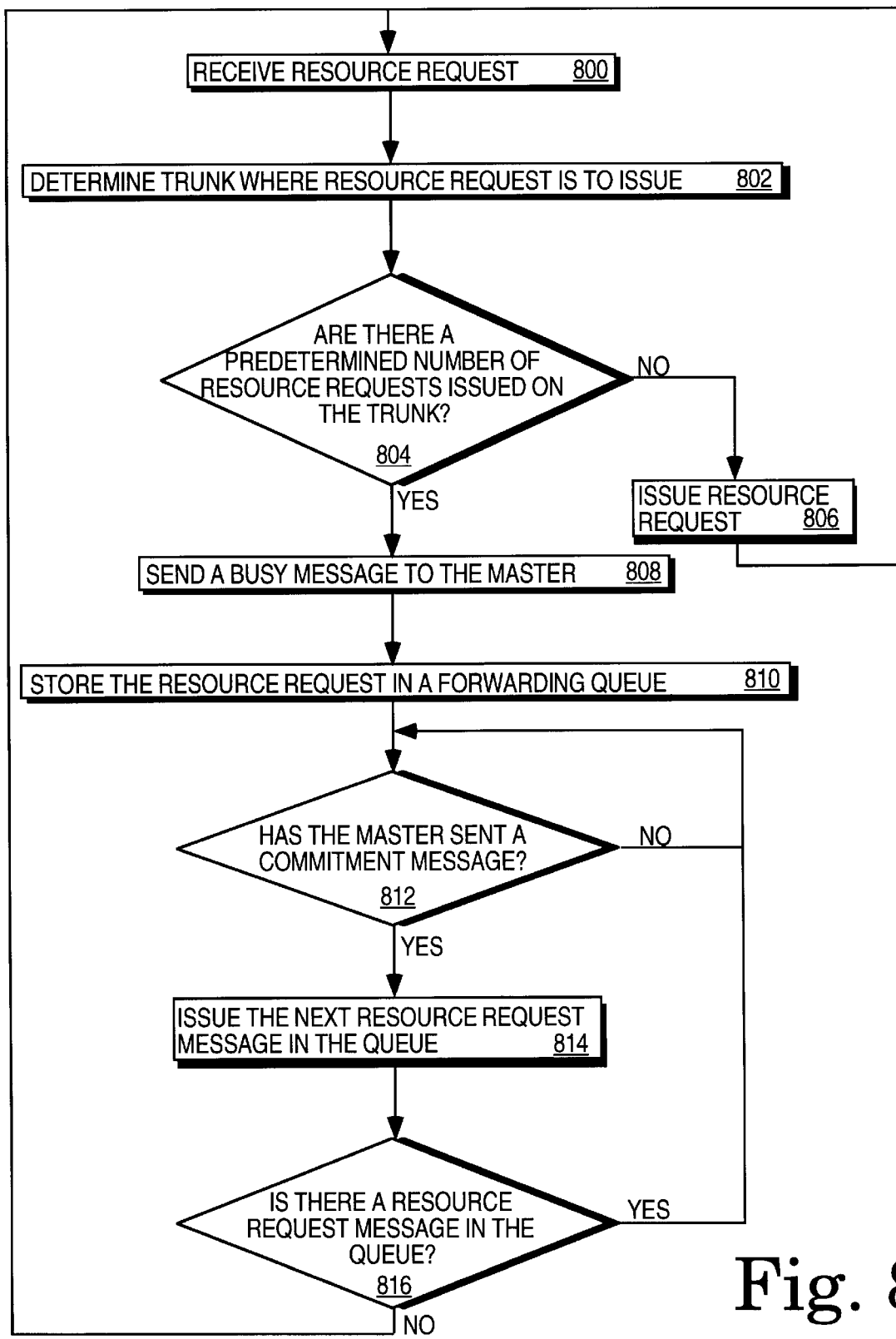
FIG. 8 is a flow chart illustrating a method for scheduling routing requests according to the present invention.

FIG. 8 is a flow chart illustrating a method for scheduling routing requests according to the present invention. At step 800, a resource request message is received by a node.

At step 802, the node determines an identity of a trunk where the resource request message is to issue. The identity of the trunk can be determined by reading the resource request message.

At step 804, it is determined whether a predetermined number of resource request messages are currently issued on the trunk. If a predetermined number of resource request messages are currently issued on the trunk, control proceeds to step 808. If a predetermined number of resource request messages are not currently being issued on the trunk, control proceeds to step 806.

At step 806, the resource request message is issued on the trunk. Control proceeds to step 800 where the node waits to receive a next resource request message.

At step 808, a busy or congestion message is sent to the master.

At step 810, the resource request message is stored in a forwarding queue. In one embodiment of the present invention, the forwarding queue is a first-in-first-out memory.

At step 812, it is determined whether the master has sent a commitment message in regards to one of the resource request messages that was issued on the trunk. If the master has sent a commitment message, control proceeds to step 814. If the master has not sent a commitment message, control proceeds to step 812.

At step 814, the node issues the next resource request message in the forwarding queue on the trunk.

At step 816, it is determined whether there are any remaining resource request messages in the forwarding queue. If there are remaining resource request messages in the forwarding queue, control proceeds to step 812. If all the resource request messages in the forwarding queue have been issued, control proceeds to step 800 where the node waits to receive a next resource request message.

In the foregoing description, the invention is described with reference to specific exemplary embodiments thereof. It will, however, be evident that various modification and changes may be made thereto without departing from the broader spirit and scope of the invention as set forth in the appended claims. The specification and drawings are, accordingly, to be regarded in an illustrative rather than a restrictive sense.

What is claimed is:

1. A method for scheduling a connection through a node, comprising the steps of:

receiving a resource request message from a master;

determining an identity of a trunk where the resource request message is to issue;

issuing the resource request message if the node is issuing less than a predetermined number of resource request messages previously received;

sending a busy message to the master if the node has the predetermined number of resource request messages outstanding on the trunk; and storing the resource request message in a forwarding queue if the node has the predetermined number of resource request messages outstanding on the trunk, wherein the resource request message may be issued on the trunk by the node without requiring the master to resend the resource request message.

2. The method of claim 1, wherein the forwarding queue is a first-in-first-out memory.

3. The method of claim 1, wherein the step of determining the identity of the trunk where the resource request message is to issued is achieved by reading the resource request message.

4. The method of claim 1, further comprising the step of issuing a next resource request message in the forwarding queue after the node has received a resource commitment message from the master.

5. The method of claim 1, further comprising the steps of:

setting a timer for a predetermined period of time at the master; and adjusting the timer according to a degree of congestion carried in the received busy message.

6. The method of claim 1, further comprising the steps of:

determining whether the node has a resource associated with the resource request message available; and sending a rejection message to the master if the resource is not available.

7. A computer-readable medium having stored thereon sequences of instructions, the sequences of instructions including instructions which, when executed by a processor, causes the processor to perform the steps of:

receiving a resource request message from a master;

determining an identity of a trunk where the resource request message is to issue;

determining whether the processor is issuing a predetermined number of resource request messages previously received on the trunk;

issuing the resource request message if the processor is issuing less than the predetermined number of resource request messages previously received on the trunk;

sending a busy message to the master if the processor has the predetermined number of resource request messages outstanding on the trunk; and storing the resource request message in a forwarding queue where the resource request message may be issued on the trunk by the node without requiring the master to resend the resource request message.

8. The computer-readable medium of claim 7, wherein the forwarding queue is first-in-first-out (FIFO) memory.

9. The computer-readable medium of claim 7, further comprising the instructions which, when executed by the processor, would cause the processor to perform the step of issuing a next resource request message in the forwarding queue after receiving a resource commitment message from the master.

10. The computer-readable medium of claim 7, wherein the step of determining an identity of the trunk where the resource request message is to issue is achieved by reading the resource request message.

11. The computer-readable medium of claim 7, further comprising the instructions which, when executed by the processor, would cause the processor to perform the steps of:

setting a timer for a predetermined period of time at a source processor; and making adjustments according to a degree of congestion carried in the busy message.

12. The computer-readable medium of claim 7, further comprising the instructions which, when executed by the processor, would cause the processor to perform the steps of:

determining whether the processor has a resource associated with the resource request message available; and sending a rejection message to the master if the resource is not available.

13. A switch comprising:

a trunk receiver that receives a resource request message from a master;

a routing engine, coupled to the trunk receiver, that determines an identity of a trunk where the resource request message is to be issued and whether the switch is issuing a predetermined number of resource request messages previously received on the trunk, the switch issuing the resource request message if the switch is issuing less than the predetermined number of resource request messages previously received on the trunk and storing the resource request message in a forwarding queue if the switch is issuing more than the predetermined number of resource request messages on the trunk where the resource request message may be issued on the trunk by the node without requiring the master to resend the resource request message.

14. The switch of claim 13, wherein the forwarding queue is a first-in-first-out memory.

* * * * *